United States Patent [19]

Grün et al.

[11] 4,307,776

[45] Dec. 29, 1981

[54] HEATING METHOD AND APPARATUS

[76] Inventors: Wolfgang Grün; Ingo Grün, both of Preussenstr. 31-35, 4030 Ratingen 6-Hösel, Fed. Rep. of Germany

[21] Appl. No.: 964,396

[22] Filed: Nov. 29, 1978

[30] Foreign Application Priority Data

Dec. 22, 1977 [DE] Fed. Rep. of Germany ....... 2757193
Sep. 2, 1978 [DE] Fed. Rep. of Germany ....... 2838382

[51] Int. Cl.³ ............................................. F25B 29/00
[52] U.S. Cl. .................................... 165/48 S; 165/57; 165/59; 98/31; 98/33 R; 126/428; 62/259.1
[58] Field of Search ..................... 165/48 S, 53, 54, 56, 165/57, 59, 61, 66, 122, DIG. 12, 29; 98/1, 31, 33 R; 126/428, 452; 62/259

[56] References Cited

U.S. PATENT DOCUMENTS

| | | | |
|---|---|---|---|
| 3,581,649 | 6/1971 | Rauenhorst | 98/33 |
| 3,756,137 | 9/1973 | Scharres | 98/1 |
| 3,991,819 | 11/1976 | Clark | 165/29 |
| 4,040,804 | 8/1977 | Harrison | 165/DIG. 12 |
| 4,061,186 | 12/1977 | Ljung | 165/59 |
| 4,142,575 | 3/1979 | Glancy | 165/29 |

*Primary Examiner*—Albert W. Davis
*Assistant Examiner*—Margaret A. Focarino
*Attorney, Agent, or Firm*—James C. Wray

[57] ABSTRACT

Process and equipment for the exchange of heat between flows of a medium flowing in and out of a building, and facade assemblies in which the process is implemented.

9 Claims, 4 Drawing Figures

HEATING METHOD AND APPARATUS

SUMMARY OF THE INVENTION

The invention consists of a process and equipment for the exchange of heat between flows of a medium flowing in and out of a building. The medium can be air or water. The invention also includes an assembly which is installed on the outer wall of buildings. In order that the media be utilized, they must move into and out of a building. If air is to be used it may be air circulating for purposes of ventilation. If water is to be used it may be water from the water supply system, or it may be waste water.

When ambient temperatures outside of the building are low, the air inside the building, warmed by various heat sources, reaches a temperature higher than the temperature of the air outside. Water inside the building is warmed prior to its use and achieves temperatures which are higher than the temperature of the water that flows into the building.

It is known that passive heat-exchangers can transfer heat from warmed media, flowing out of a building, to the colder media entering it. However, if size and construction costs should be kept within financially reasonable limits, it becomes impossible to achieve even nearly complete heat transfer through passive heat exchangers. Since the medium flowing into the building cannot reach the temperature of the medium flowing out, a quantity of heat proportionately equal to the temperature difference between the two flows is continously leaking from the building into the environment and thus energy is being lost.

The object of this invention is the avoidance of such energy losses to the maximum degree possible.

The invention consists, first, of a process using heat exchangers for the exchange of heat between flows of a medium entering and leaving a building. A characteristic feature of the process is that the flows, after passing through a passive heat exchanger, are let each into one of the two warm, or cold, heat exchangers of a heat pump. Through the addition of the heat pump and its two heat exchangers, the incomplete temperature equalization occuring in the passive heat exchanger can be rectified to the extent that the temperatures of the incoming and outgoing flows of the medium become equal.

The quantity of energy required for the heat pump is, as is well known, substantially smaller than the quantity of energy transferred by the pump. It becomes thus possible to use a substantial part of the energy that otherwise would have been lost to increase the temperature of the medium leaving the passive heat exchanger, after it enters the building, up to the level of the desirable temperature within the building. At the same time, the use of a passive heat exchanger diminishes the usage, and thus the operating costs, of the heat pump.

In a preferred version of the discovered process, both flows of the medium are guided in the same direction through the passive heat exchanger. After that they arrive in both heat exchangers of the heat pump, which are placed behind the passive heat exchanger and across the flows of the medium.

In another version of the invented process, the flows of the medium pass through the passive heat exchanger moving in opposite directions to each other. In this case each heat exchanger of the heat pump is placed across the flow it serves and behind each end of the passive heat exchanger; that is, each heat exchanger of the heat pump is installed at each end of the passive heat exchanger.

When the construction of the passive heat exchanger is such that the flows of the medium pass through it in a straight line, the two heat exchangers of the heat pump should be placed at the two opposite ends of the passive heat exchanger. If the flows of the medium move in a U-shaped form inside the passive heat exchanger, then the heat exchangers of the heat pump can be placed very close to each other.

According to another characteristic of the invention, devices or materials transmitting humidity can be placed between the flows subjected to the heat exchange process. Such materials can be porous walls installed between the flows, or pipes by means of which condensed water from the cooled air is directed into the warmed air. This makes possible not only to maintain the desired level of humidity inside the building but also to save the energy that would otherwise be needed to humidify the air.

The equipment necessary for the heat exchange and, if so desired, for the humidity transfer, can be installed in various places inside or outside the building. If they are to be placed inside the building, it is particularly advantageous that they be installed in the space existing between the ceiling and the underceiling, between floors. It is also possible to install the heat and humidity transfer equipment on the outer walls of the building.

If the medium flowing in and out of the building is water, then it may often happen that the quantity of water flowing per time unit in and out of the building is not always the same. In this case it is expedient to have two storage tanks, one each for the water flowing in and out of the building, and to install in each of these tanks the appropriate heat exchanger of a heat pump.

The invention includes furthermore a facade element with at least one insulated side, which is installed at one of the outer walls of a building. Facade elements are well known. They can serve different purposes. They can be used to visually improve the external appearance of buildings, particularly large buildings. On the other hand they can also assist in the ventilation or shading of the front of the building if they extend out some distance from it. Finally, such elements can be used to improve the heat balance and climatic conditions existing inside buildings.

This latter effect is limited however in that some protection from direct sun rays only is achieved. The effect is more pronounced particularly when facade plates are used and when facade plates are ventilated from the rear, in which case their protective effect can be taken into consideration in calculating the heat balance of the building.

In addition, it is known that the outer walls of a building can be included in a heating system if, for example, they are at least partly hollow and the heating medium circulates in the space thus created.

In any case, a building usually needs a central energy supply system including heating equipment and pumps which move the heating medium, for example water or air, through ducts and heating elements.

In more recent times, air conditioning equipment is also installed in buildings. In relatively small buildings single unit air conditioning equipment is used for each room. Such units operate independently of each other and can be installed for example, in openings on the outer walls. Larger buildings, particularly high-rise buildings, use central air conditioning equipment which can be installed in a separate floor together with other machinery. But central air conditioning requires additional pipes and ducts for the exchange of cooled air and return air.

All this implies not only additional construction and installation costs but also additional energy for heating equipment on the one hand and air conditioning equipment on the other.

It is therefore desirable to build the facade element in such a way that it contributes considerably to the heat balance and air conditioning of the building thus replacing, at least partly, the heating and air conditioning equipment.

The facade assembly included in this invention accomplishes this by means of a median plate set between an insulated outer siding and an interior siding. An inlet is provided between exterior siding and median plate for a ventilation channel which is connected to each lower floor. An outlet is provided between the median plate and the interior siding for the fresh air channel leading from each facade element to the floor directly above it. The spent air and fresh air flows are thermodynamically coupled to a heat pump.

This way a facade assembly is created that can assure to a substantial extent the function of the heating and air conditioning equipment, for it guides a spent air flow and a fresh air flow in such a way that these flows are separated only by an intervening median plate which permits an intensive heat exchange, even if th plate is made of common materials. Thus a great part of the heat emitted by various heat sources within a building (people, machines, lights and eventually heating) is transferred to the fresh air inflow, and, streaming back into the building, the heat becomes reusable. When the fresh air is warmer than the exhaust air, the heat exchange process is reversed and thus an undesirable increase of the temperature inside the building is prevented.

Transfer of humidity to the intake air also does not require any additional energy because vaporization energy required on one side of the median plate is compensated by condensation heat on the other side of the plate.

The median plate should be made preferably of heat conducting and/or humidity transmitting materials which should permit a direct and immediate exchange of heat and/or humidity, whereby, if the occasion arises, a difference between the intake of the humidity and exhaust air can also be exploited. Consequently, with this facade element, included in the invention, there is no need for separate single unit air conditioners or central air conditioning equipment with its associated pipes and ducts. Thus, space is saved and construction can become simpler.

Assembly and installation cost of the facade element are held within usual margins. At any rate there is no additional expense involved, because the facade element itself is delivered pre-fabricated and can be immediately attached to the building. Specifically, it is possible to attach the facade assembly of the invention to an already existing building. In this case the facade element is attached, like a parapet, to the outer wall of the building at the front of each floor. Finally, every floor or separate space can be heated or air conditioned essentially independently of the others by using adjustable vents, or something equivalent, on the fresh-air or exhaust channels. A reduction of the window area is not necessary because all important parts of the facade element can be easily installed within the area usually available. Whatever the case may be, the desired exchange between spent air and fresh air does not diminish. On the contary, it is assisted by the unidirectional movement of spent air and fresh air on either side of the median plate of the facade element. A practical way to employ the flow channels would be to equip the flow channels ending at the lower edge of a window with slotted vents, one each for the spent air and the fresh air flows, which vents should extend over the entire width of the facade element. With this arrangement a "curtain" of exhaust air covers the entire outer surface of the window which prevents it from cooling.

The operation and effectiveness of the facade element included in this invention can be improved or maximized by the addition close to the inlet and outlet vents of a fan which on one side pushes fresh air and on the other moves spent air. Specifically, one segment of the fan is used for moving fresh air and another segment moves spent air. Also, the fan can be equipped with a control and driving mechanism that permits individual heating or air conditioning of the space directly behind the facade element.

For the construction of the median plate, the principles already mentioned are applicable. If a material is available that is both heat conducting and porous enough to transmit humidity, it is fully satisfactory to use it exclusively for the median plate. On the other hand it is also possible to equip the partition with a humidity transmitting and exchanging device and with another device that would exchange heat. Particularly suitable as heat exchangers are finned heat exchangers, made, for example, of aluminum, whose fins are oriented on one side towards the spent-air channel and on the other side toward the fresh air channel. It may be advantageous to insulate the median plate in the area of the heat pump.

It may be expedient to place the parapet-like facade element at an angle to the vertical so as to form a triangular channel between the insulated interior side of the element and the exterior siding of the building, or between the interior side of the element and a radiating element that takes the place of the outer wall of the building at that point. The shaft thus formed can serve for the electrical installation. This way the usual layout of shafts for the electrical circuits becomes superfluous. Instead, it is enough to have smaller shafts branching out from the main electrical shaft, formed between the facade element and the building proper, to the various rooms. It is also possible to use beams extending beyond the outer side of the facade element in order to support the element itself and a balcony-like projection. This balcony can be used, for example, to clean windows or as an emergency escape. It will also protect the floor below from the sun.

Furthermore, it is possible to install solar energy collectors on the outer side of the facade element. Such solar energy collectors would then be thermodynamically coupled to the heating and air conditioning system of the facade element. Optimal usage of sun rays can be achieved by giving the facade element the proper inclination against the vertical. Should the balcony be made of a transparent material, additional solar energy collectors can be installed beneath it.

DETAILED DESCRIPTION OF THE DRAWINGS

Figure 1:
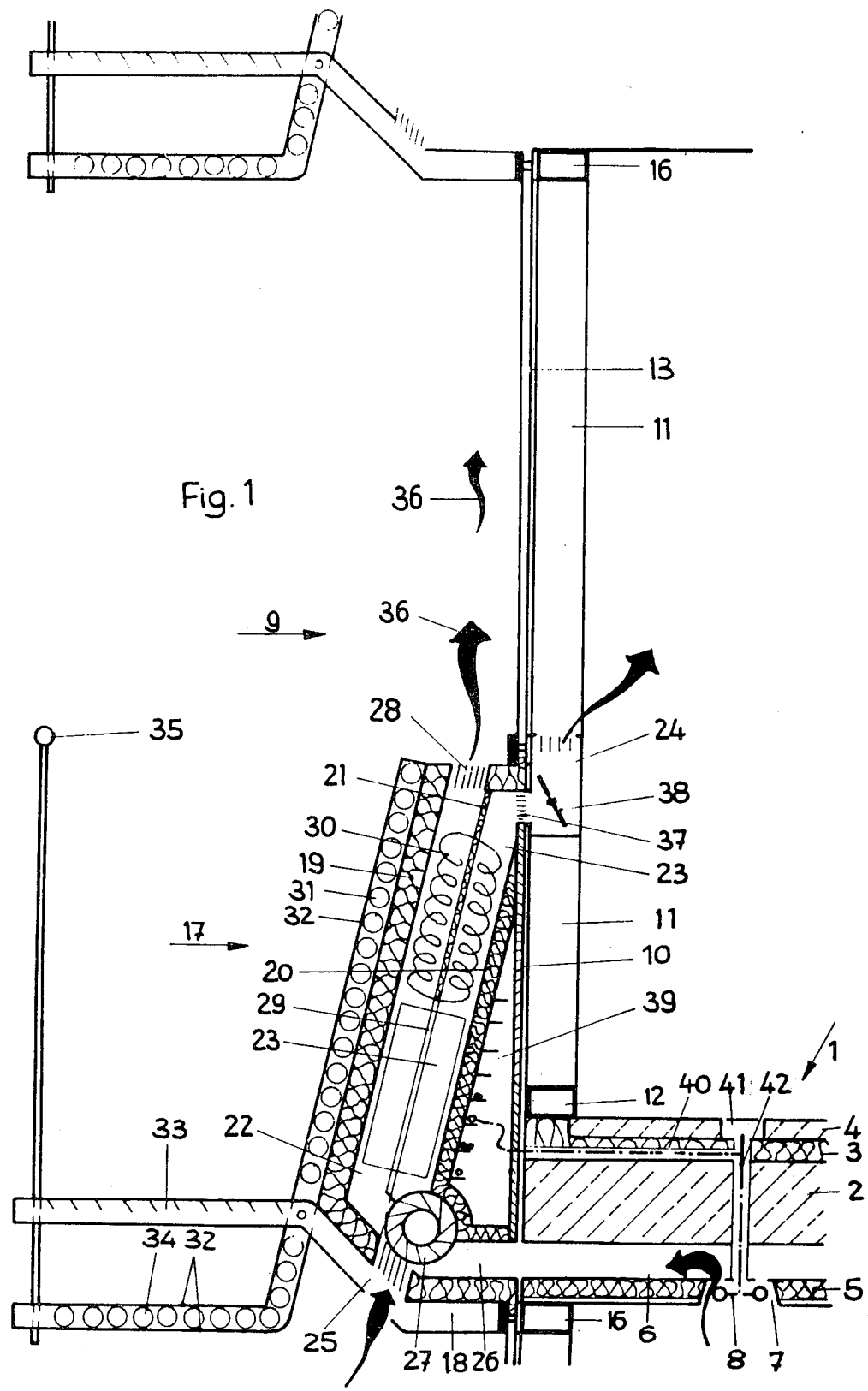
FIG. 1 is a partial section of the front of a building, equipped with projected parapet-like facade element.
Figure 2:
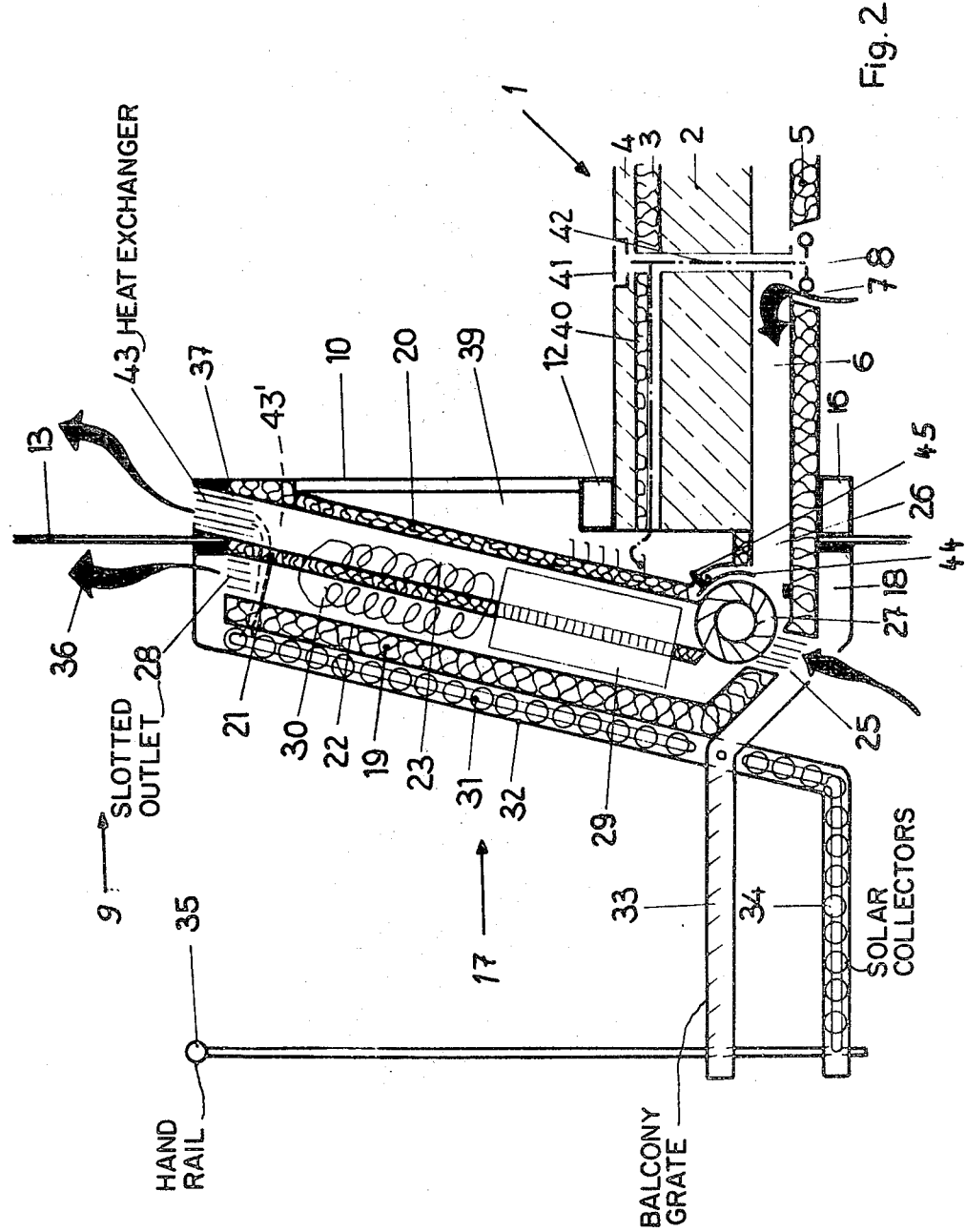
FIG. 2 is another version of the above.

The buildings shown in FIGS. 1 and 2 consist of several floors, of which only one is shown. Each floor is formed of ceilings, made, as is common, of a steel reinforced concrete slab 2 on which a layer of insulation 3 is attached. Finished flooring 4 is applied over insulation 3. Each floor has partitions serving the various rooms. The lower side of the steel concrete plate carries a hanging ceiling 5 attached to it in commonly used ways. The distance between the ceiling and the steel concrete slab is large enough to form a space that serves as exhaust channel for spent air coming from the floor below. The spent air moves through one or more openings 7, which can be situated close to ceiling lights 8, into space 6 between the steel concrete plate 2 and ceiling 5. From there the spent air is drawn towards the exterior side of the building 9.

The exterior side 9 of the building shown in the drawings consists of a plate 10 made of asbestos cement installed on the face of the steel-reinforced concrete slab. A column 11 extends all the way to the flooring or, as shown in the drawings, to a horizontal tie beam 12, which is a part of the load-carrying structure of the building. The plate 10 extends almost up to the upper part of the parapet-like facade element.

A common radiator (not shown) can be installed in the area of the inner side of plate 10, that is the side facing the building. Alternatively, column 11 and/or tie beam 12 can be constructed to function as radiators.

Further up, on the same level with the plate and connected to its upper end, there is an insulated glass pane 13. The columns 11 are connected on their upper end to another horizontal tie beam 16. Tie beam 16 has the same purpose and is installed in the same way as tie beam 12. Beam 16 is set directly under the hanging ceiling of the building. Column 11 and tie beams 12, 16 can also be used as non-carrying elements in which case they can be suspended in front of ceiling plate 2.

In the area of the parapet, i.e., directly in front of plate 10, there is a facade element 17 which is supported by beams 18 projecting from the face 9 of the building.

The facade element has an exterior side 19 consisting of two insulated steel plates. An interior side also consists of two steel plates insulated from each other, and a median plate. Exterior side 19, interior side 20 and median plate 21 are arranged in such a way that a flow channel 22 is formed between exterior side 19 and median plate 21. This channel is connected to space 6, while another flow channel 23 is formed between median plate 21 and interior side 20. Flow channel 23 enters the building passing between plate 10 and insulated glass pane 13 and ends at a slotted vent 24. The purpose of channel 23 is to supply the building with fresh air which arrives at channel 23 after passing through a slotted inlet vent 25 at the lower end of the facade element 17.

The drawings show that in the area of the fresh air inlet 25 and in the area of an inlet 26 connected to space 6, there is driven fan 27. One segment of this fan moves fresh air, while another segment moves spent air into corresponding respective flow channels.

Flow channels 22 and 23 extend over the entire width of the facade element. And spent air flow channel 22 ends at a slotted outlet 28 placed on the upper end of the facade element.

In the version depicted in the exemplifying drawings, the lower segment of median plate 21 that connects to fan 27 is made of heat conducting and humidity transferring materials. Additionally, the segment is provided with a slotted heat exchanger 29 whose slots, made of aluminum or copper, extend into both flow channels 22 and 23. The other segment of the median plate which extends into the areas of outlets 24 and 28 is insulated. In the area of this segment a heat pump 30 is installed. The active parts of the pump extend into flow channels (shaft) 22 and 23.

The heat pump and its heat exchangers and humidity exchanger, if one is desired, can be constructed as a supplementary assembly.

On the exterior siding of the facade element there are solar energy collectors 31. The collectors are arranged under a light-transparent cover 32 which prevents them from cooling.

The beams 18 for the facade element extend beyond the exterior siding 19 of the facade element and carry a grate or a screen 33 whose elements are inclined at an angle that depends on the prevalent direction of the sun rays so that additional solar energy collectors 34 can be installed under the screen 33.

The screen 33 itself forms a balcony-like projection which is equipped with a safety handrail 35. This projection can serve various purposes, for example, it can be used for cleaning the front of the building 9 or as an emergency escape. In addition, the balcony-like screen and the battery of solar cells 34 beneath the screen form a sunshade for the floor just below it. The solar energy collectors 34 are also surrounded by covers 32 which protect them from cooling.

The mode of operation of the assembly shown is the following:

Fan 27 draws through part 7, space 6 and inlet 26, spent air from the room below ceilings and moves this spent air into flow channel 22, which is formed by exterior siding 19 and median panel 21. At the same time, fan 27 takes in fresh air through the slotted inlet 25, at the lower end of the facade element and pushes this fresh air into flow channel 23 formed by interior siding 20 and median panel 21. Because of the heat conducting and humidity transmitting properties of median panel 21 and other elements existing in this area, an exchange of heat and humidity takes place between the flows of fresh air and spent air.

In this process, spent air and fresh air move in the same direction. The spent air moving outwards through flow channel 22 serves as a heat shield front of the fresh air moving through internal flow channel 23. Depending on actual conditions, the fresh air is warmed and the spent air is cooled, or vice versa. Either the fresh air or the spent air is humidified. The exchange of humidity does not require additional energy because the quantity of condensation heat created on the one side of median siding 21 covers the needs for vaporization energy in the other side. After the exchange of heat and humidity, the spent air leaves the facade element through slotted outlet 28, which is close to the insulated glass pane 13, and moves in the direction of arrows 36 upwards in front of the insulated glass pane 13. The air forms a heat shield in front of this glass pane 13 and prevents it from cooling.

Another glass pane (not shown in the drawings) can be installed at some distance in front of the insulated glass pane, so that between these two glass panes a channel is formed for the spent air flowing out of the buildings. The fresh air moves through a filter 37, installed at the lower end of flow channel 23, into distributing channel (shaft) 24 where one or more adjustable valves 38 permit individual adjustment of the quantity of air streaming in. Heat elements can be placed in the area of filter 37 to heat the fresh air. It is advantageous to adjust these heat elements so that the temperature of the fresh air remains constant. The additional solar energy collectors 32, 34 are thermodynamically connected to the heating and air-conditioning system of the facade assembly and give to this system their stored heat.

One can see in FIGS. 1 and 2 that the facade assembly 17 is inclined against the vertical. The angle should be selected preferably with regard to the best possible utilization of prevalent sun radiation. Through this arrangement a triangular space is formed between interior siding 20 and plate 10. This space can serve as main duct 39 for the electrical installation so that other ducts for this purpose become basically superfluous, provided of course that feeder ducts 40 branch out from this main duct towards the various rooms. Such feeder ducts should run next to insulation layer 3 and end in junction boxes 41 set in the flooring 4. Conduits 42 from such junction boxes can pass through the concrete slab 2 to provide connections for lights fastened on ceiling 5 of the room below.

Figure 3:
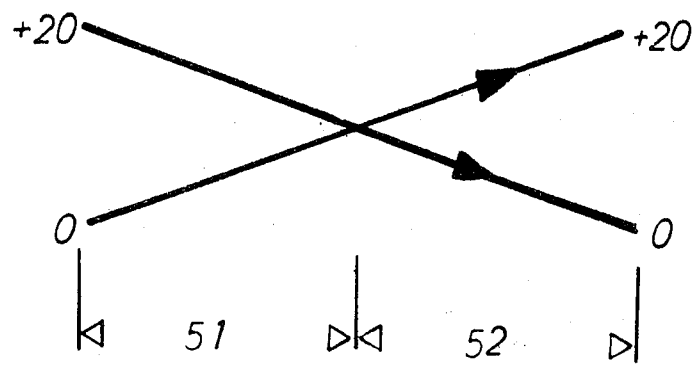
FIG. 3 shows a mode of operation of the process.
Figure 4:
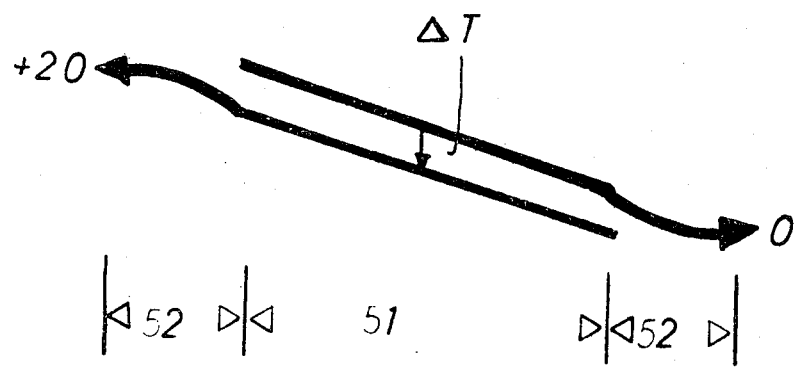
FIG. 4 illustrates another mode of operation of the process.

In the example shown in FIG. 2, identical parts have been given the same numbers. Plate 10 at the front of the building is made to function as heat radiating element and is operationally connected to the solar energy collectors 31, 34 so that their stored heat can be directly used for heating purposes. The connections needed for accomplishing this end are shown as 43' in the drawing. An additional heating 43 element can be installed in the area of the fresh air outlet to transfer heat from the solar energy collectors. Furthermore, FIG. 2 shows a fire safety valve 44 in the area of fan 27 and inside spent air inlet 26. The fire safety valve has the form of a half cylinder and is held in its open position by a heat sensitive part 45. Should the exhaust air be heated up by a fire, the heat sensitive element is automatically destroyed and the valve snaps into its closed position (not shown) blocking spent air inlet 26. The fire safety valve 44 can move into its closed position of its own weight but the movement can be also assisted by springs. FIGS. 3 and 4 hypothesize, as an example, that the temperature of a medium flowing into a building is increased from 0° to 20° C., and the temperature of spent air flowing out of the building is decreased from 20° C. to 0° C.

FIG. 3 shows the pattern of flows and temperatures of media moving in the same direction. Number 51 is given to the pattern of flows and temperatures inside the passive heat exchanger and number 52 shows the pattern of flows and temperatures in both heat exchangers of the heat pump. In FIG. 4 the media flow in opposite directions to each other. Number 51 is again given to the pattern of flows and temperatures inside the passive heat exchanger. Number 52 shows the pattern of flows and temperatures inside both heat exchangers that belong to the heat pump.

While the invention has been described with reference to specific examples, it will be obvious to those skilled in the art that modifications and variations may be constructed without departing from the invention. The scope of the invention is set forth in the following claims.

We claim:

1. A facade element for installing on an exterior wall of a building, for carrying out the process of using heat exchangers for the exchange of heat between flows of a medium streaming in and out of a building, wherein the flows of the medium after passing through a passive heat exchanger are directed to a heat pump and each one of the flows passes through the appropriate warm, or cold, heat exchangers of the heat pump, comprising the following characteristics, an insulated exterior wall and an interior wall, a medium partition, whereby exterior wall and medium partition form, on the intake side, a flow channel which connects to the floor of the building below the facade element and draws spent air out of that floor, and the interior wall and the medium partition form on the outlet side, flow channel for fresh air which channel connects to the upper floor served by the facade element, and a heat pump thermodynamically coupled to the channels.

2. The facade element of claim 1 and equipped with a heat-conducting partition.

3. The facade element of claim 1 with the characteristics that the flow channels ending at the area of the lower edge of a window extend substantially the entire width of the facade element and that the outlets for fresh air and spent air are equipped with slotted vents.

4. A facade element in accordance with claim 1 with the characteristic that a fan is installed in the area of the inlets for fresh air and spent air in such a way that the fan moves on the one side fresh air and on the other spent air.

5. A facade element of claim 1 with the characteristic that a fire safety valve having half-cylinder form is placed inside the spent air channel in the area of the fan and heat-sensitive materials hold the valve, so that when heat-sensitive materials are destroyed, the safety valve falls into its closed position of its own weight and/or with the assistance of springs.

6. The facade element of claim 1 with the characteristic that the medium partition is insulated and is insulated in the area of the heat pump.

7. The facade element of claim 1 with the characteristic that the front part of the element is inclined in relation to the vertical so that a shaft for electrical installation is formed between the insulated interior wall of the element and the outer wall of the building.

8. The facade element in accordance with claim 7 with the characteristic that solar energy collectors, thermodynamically integrated in the heating and air-conditioning system of the facade element, are installed on the front of the exterior wall of said element.

9. The facade element in accordance with claim 8, with the characteristic that a balcony-like structure is equipped with a transparent floor below which solar energy collectors are installed.

* * * * *